(12) United States Patent
Reshef et al.

(10) Patent No.: US 10,757,561 B2
(45) Date of Patent: Aug. 25, 2020

(54) WI-FI DOCKING IN DENSE ENVIRONMENT

(71) Applicant: Intel Corporation, Santa Clara, CA (US)

(72) Inventors: Ehud Reshef, Qiryat Tivon (IL); David Birnbaum, Modiin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/369,485

(22) Filed: Mar. 29, 2019

(65) Prior Publication Data

US 2019/0222997 A1 Jul. 18, 2019

(51) Int. Cl.
| | |
|---|---|
| *H04W 8/00* | (2009.01) |
| *H04W 52/38* | (2009.01) |
| *H04W 88/00* | (2009.01) |
| *H04W 76/14* | (2018.01) |
| *H04W 56/00* | (2009.01) |
| *H04W 52/50* | (2009.01) |
| *H04W 52/32* | (2009.01) |
| *H04W 84/12* | (2009.01) |

(52) U.S. Cl.
CPC ......... *H04W 8/005* (2013.01); *H04W 52/325* (2013.01); *H04W 52/38* (2013.01); *H04W 52/383* (2013.01); *H04W 52/50* (2013.01); *H04W 56/0005* (2013.01); *H04W 76/14* (2018.02); *H04W 88/00* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2013/0145050 A1* | 6/2013 | Huang | ................... | H04W 76/14 710/3 |
| 2014/0351477 A1* | 11/2014 | Lee | ..................... | H04L 61/2528 710/303 |
| 2014/0351602 A1* | 11/2014 | Lee | ........................ | H04W 12/02 713/189 |
| 2014/0355763 A1* | 12/2014 | Lee | ......................... | G06F 3/038 380/282 |
| 2015/0205747 A1* | 7/2015 | Dees | ................... | G06F 13/4068 710/303 |
| 2015/0230280 A1* | 8/2015 | Dees | ................... | H04W 12/003 455/39 |

(Continued)

*Primary Examiner* — Anh Vu H Ly
(74) *Attorney, Agent, or Firm* — Eversheds Sutherland (US) LLP

(57) ABSTRACT

This disclosure describes systems, methods, and devices related to Wi-Fi based wireless docking Wi-Fi based wireless docking. A device may coordinate with one or more docking stations on a Wi-Fi network to determine a first docking channel to be used for wireless docking of a first station device. The device may adjust a transmit (TX) power of a beacon frame during a discovery mode associated with the wireless docking. The device may determine a discovery channel configured to be different from the first docking channel used for the wireless docking. The device may identify a request from a first station device requesting wireless docking, wherein the request is received on the discovery channel. The device may initiate a wireless docking session with the first station device using the first docking channel.

20 Claims, 8 Drawing Sheets

(56) References Cited

U.S. PATENT DOCUMENTS

| | | | |
|---|---|---|---|
| 2015/0296552 A1* | 10/2015 | Huang | H04W 8/005 |
| | | | 370/252 |
| 2016/0014172 A1* | 1/2016 | Van De Laar | H04W 4/00 |
| | | | 709/229 |
| 2016/0081132 A1* | 3/2016 | Lee | H04M 1/7253 |
| | | | 370/338 |
| 2016/0095062 A1* | 3/2016 | Rabii | H04W 52/0235 |
| | | | 370/311 |
| 2016/0278006 A1* | 9/2016 | Lee | H04W 48/18 |
| 2016/0309420 A1* | 10/2016 | Verma | H04W 52/243 |
| 2016/0323456 A1* | 11/2016 | Bernsen | H04M 11/007 |
| 2016/0334837 A1* | 11/2016 | Dees | G06F 13/4081 |
| 2017/0048373 A1* | 2/2017 | Dees | H04L 12/2814 |
| 2017/0164413 A1* | 6/2017 | Bernsen | H04W 4/80 |
| 2017/0242480 A1* | 8/2017 | Dees | G06K 9/00671 |
| 2017/0289277 A1* | 10/2017 | Lee | H04W 84/18 |
| 2018/0095500 A1* | 4/2018 | Cohn | H04W 12/0401 |
| 2018/0107246 A1* | 4/2018 | Dees | H04B 7/26 |

* cited by examiner

WI-FI DOCKING IN DENSE ENVIRONMENT

TECHNICAL FIELD

This disclosure generally relates to systems and methods for wireless communications and, more particularly, to Wi-Fi docking in dense environment.

BACKGROUND

Wireless devices are becoming widely prevalent and are increasingly requesting network resources. The Institute of Electrical and Electronics Engineers (IEEE) is developing one or more standards that facilitate various services such as network access, communications between one or more wireless devices, resource management, and so on. Wireless docking is another service that is used to dock a wireless device to a docking station where the docking station will be connected to external devices such as screen, keyboard, mouse, storage, camera and similar. However, providing high quality docking experience in dense environments (office environment where there are many users sharing the same space) may be challenging to provide during the docking process.

DETAILED DESCRIPTION

Figure 1:
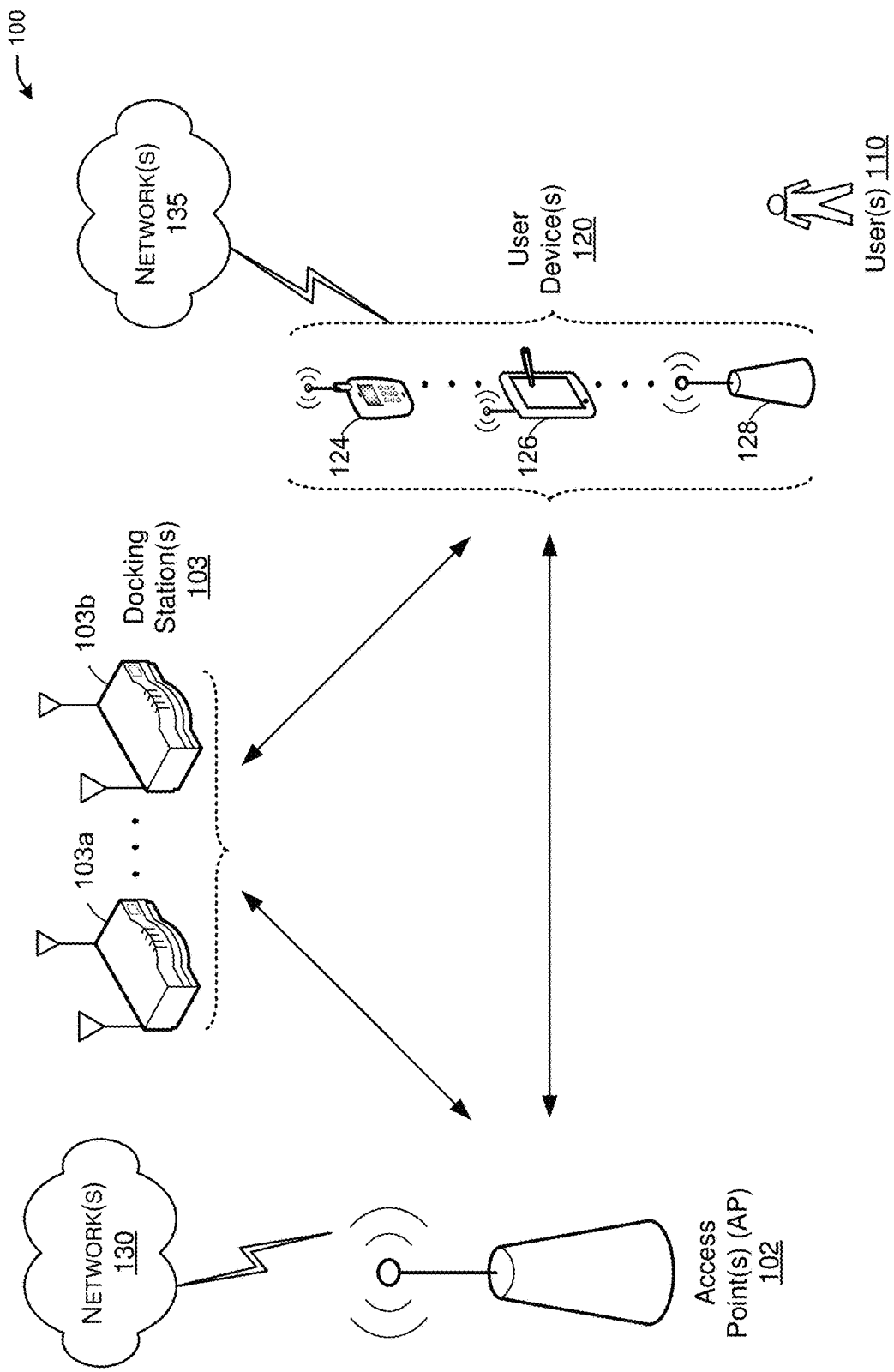
FIG. 1 is a network diagram illustrating an example network environment for Wi-Fi based wireless docking, in accordance with one or more example embodiments of the present disclosure.

Example embodiments described herein provide certain systems, methods, and devices for Wi-Fi based wireless docking system. The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In the enterprise environment the solution of docking stations has been part of the workplace environment for many years. Most of the docks are original equipment manufacturer (OEM) unique or even platform unique and of course, required physical connection between devices, for example a PC and the docking station. As the computing world evolved, modern docking was introduced with either wireless docking, using WiGig technology, or single cable docking that also provides power to the platform (using proprietary cables or USB type-C). However, as the workplace continues to evolve with workers being more mobile, shared spaces are gaining more popularity and devices are able to support more hours of battery life. This is leading to the desire of multiple ecosystem players to try again to enable wireless docking. In contrast to prior round that was focused on WiGig, this time the ecosystem is focused on using Wi-Fi to enable wireless docking, with focus on dense enterprise environment. Due to the nature of the Wi-Fi technology which utilizes shared medium guaranteeing the right key performance indicator (KPI) for docking experience is a challenging task. There is a need to address these challenges.

There were two main past attempts to solve the problem, for example, using 60 GHz/WiGig and using Wi-Fi with MIRACAST and media agnostic-USB.

The WiGig solution is too expensive (from a PC/Client platform perspective) and hence did not gain enough market share, the Wi-Fi solutions from the past did not meet the right KPIs. Both solutions suffered from the lack of wireless charging. Wireless charging (that is PC/Client relevant) is maturing these days and the industry is looking to enable docking using existing Wi-Fi—resulting in reduced cost overhead.

Example embodiments of the present disclosure relate to systems, methods, and devices for Wi-Fi based wireless docking.

In one or more embodiments, a Wi-Fi based wireless docking system may enable Wi-Fi based wireless docking in dense environments such as enterprises. This may be achieved by facilitating building a comprehensive Wi-Fi based docking roadmap. The target is to first enable one or more mechanisms where both the user platform and the wireless dock are designed using Wi-Fi technology, however, this embodiments of this disclosure are not limited to Wi-Fi.

In one or more embodiments, a Wi-Fi based wireless docking system may be applicable to wireless virtual reality experience. Some of the benefits of the Wi-Fi based wireless docking system may facilitate low latency and high bandwidth wireless experience.

In one or more embodiments, while a Wi-Fi based wireless docking system is described the context of wireless docks, it is easy to envision and apply the same set of enablers to any large set of managed peer-to-peer communication devices. It should further be noted that as some of the embodiments described in this disclosure rely on the devices having quality of service (QoS) requirements (e.g., for scheduled methods).

In one or more embodiments, a Wi-Fi based wireless docking system may be expanded to relate to more than just device pairs, as long as for each set of devices a "master device" (referred to herein as the "dock"), and several "slave devices" (referred to herein as the "dockee") may be defined. The Wi-Fi based wireless docking system may also be extended to support improved coexistence between different wireless technologies utilizing the same spectrum like Wi-Fi, Bluetooth (BT), cellular (e.g., LTE, 5G, or the like).

In one or more embodiments, a Wi-Fi based wireless docking system may improve dock discovery and connection key performance indicators (KPIs) by using reduced transmit (TX) power to advertise the dock when it is not in use such that it is only discovered when the PC/phone looking for a dock is nearby.

In one or more embodiments, a Wi-Fi based wireless docking system may use environmental sensing to dynamically reduce the Wi-Fi transmit power to minimize interruption to same channel neighboring docks or networks. In addition, the sensing will be used to improve the beam forming and antenna steering (or other digital, analog, and mechanical methods) for better alignment with the dock In one or more embodiments, a Wi-Fi based wireless docking system may facilitate a novel spectrum management solution that allows allocation and reservation of spectrum for dock-PC pairs (distributed/AP managed)

In one or more embodiments, a Wi-Fi based wireless docking system may facilitate a novel scheduling technique that builds upon 802.11ax primitives to optimize the experience in dense environment by AP scheduling air time for pairs of devices.

In one or more embodiments, a Wi-Fi based wireless docking system may facilitate utilization of concurrent connections (with and dual radio architecture, such as concurrent dual band, triple band dual concurrency, or simultaneous multi-channel) to optimize the docking experience by shaping the traffic using both connections.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of Wi-Fi based wireless docking, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 3:
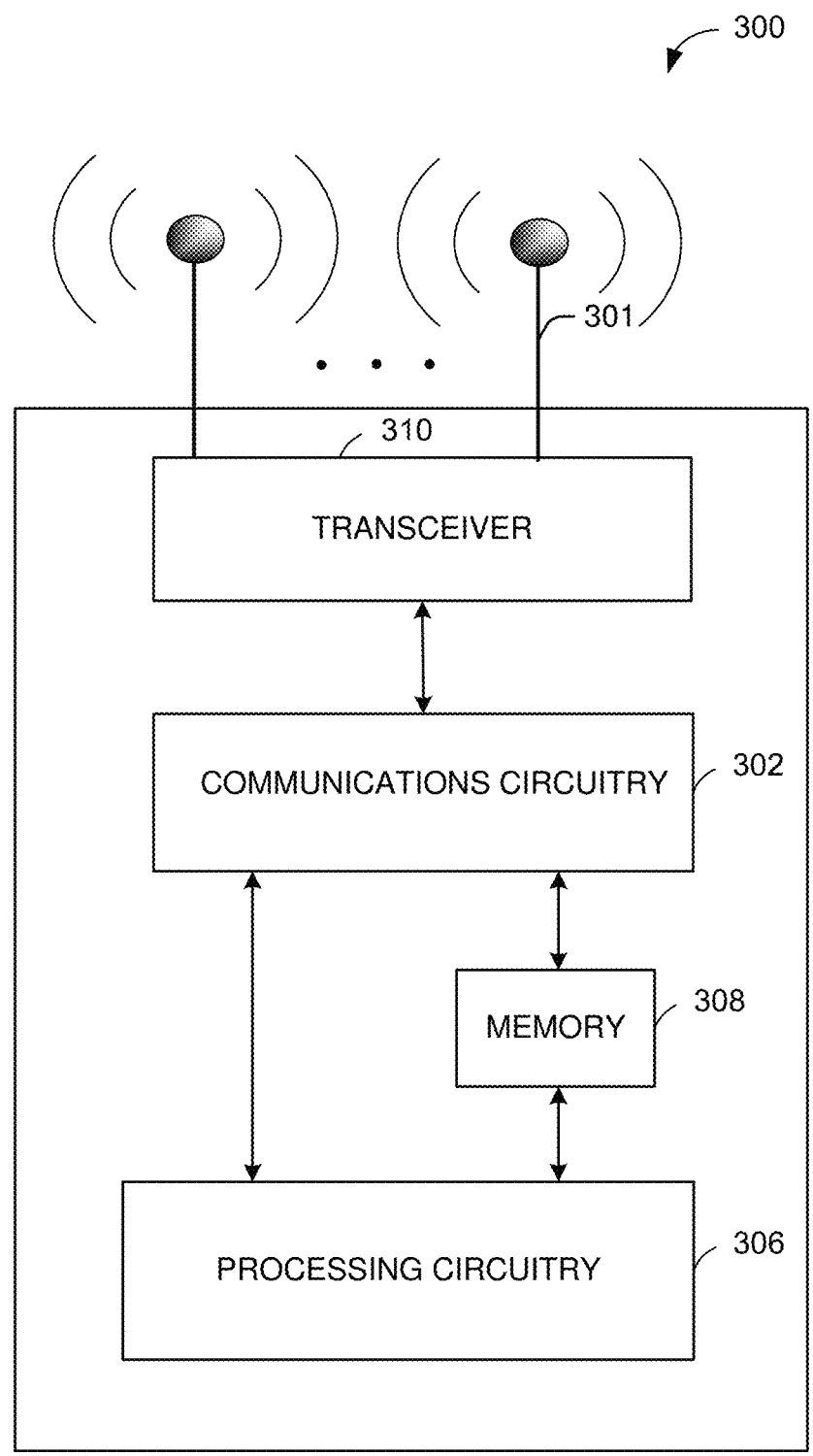
FIG. 3 illustrates a functional diagram of an exemplary communication station that may be suitable for use as a user device, in accordance with one or more example embodiments of the present disclosure.
Figure 4:
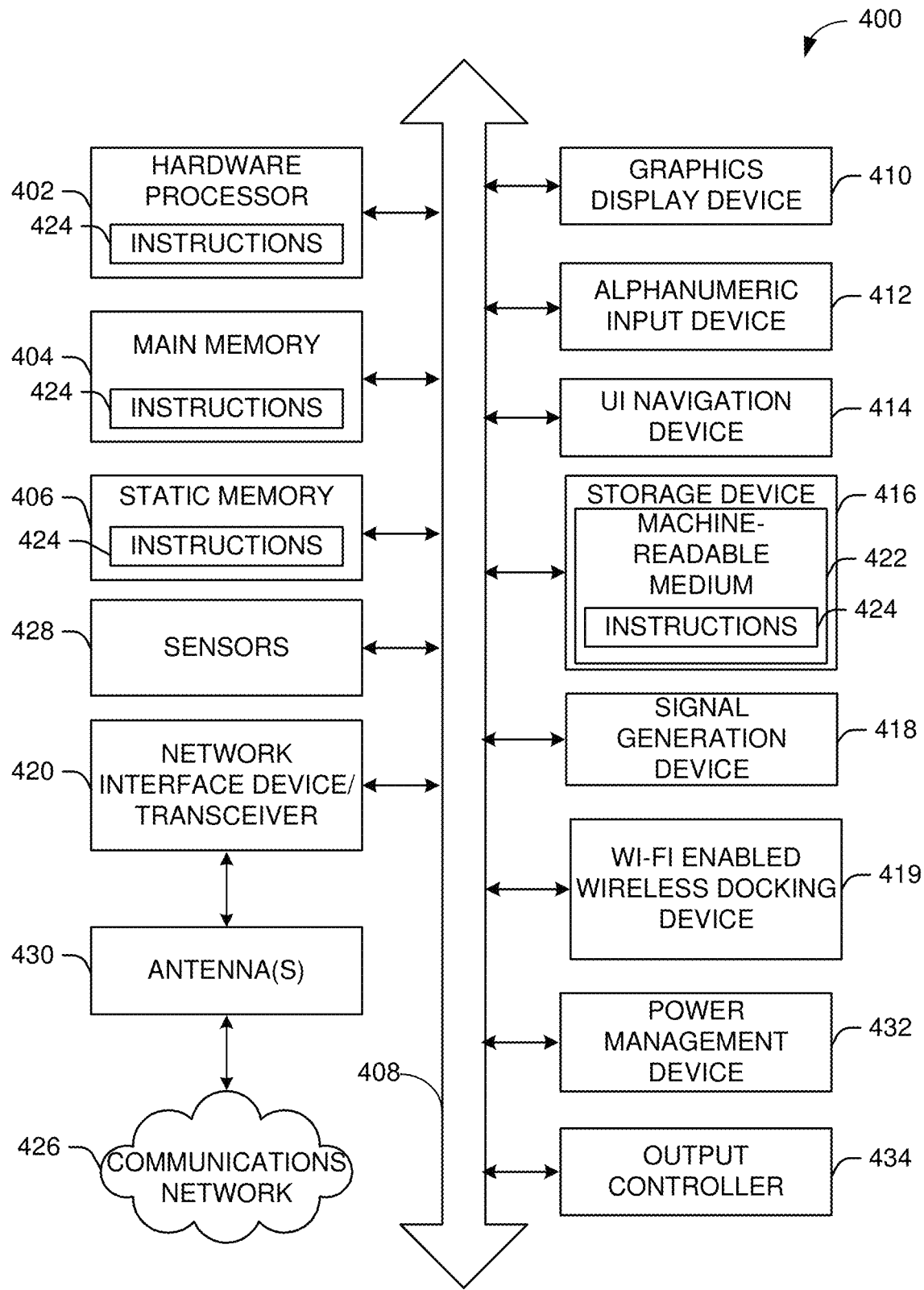
FIG. 4 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 3 and/or the example machine/system of FIG. 4.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), 6 GHz channels (802.11ax R2), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, and with reference to FIG. 1, AP 102 may communicate with one or more user devices 120. The user devices 120 may require docking (wirelessly) with one or more docking stations (e.g., docking station(s) such as 103a and/or 103b).

In one or more embodiments, a Wi-Fi based wireless docking system may facilitate a dynamically reduced Tx Power mode.

It is well known that in an interference limited deployment, the signal to noise ratio (SNR) (and therefore the feasible data rate) is only related to the frequency reuse factor, and not to the actual received signal strength indicator (RSSI), complying to the following formula:

S/I=10α log($\sqrt{3N}$−1), where N is the reuse factor, S/I is signal to interference ratio, and α is the fading coefficient.

Therefore, in an office environment, with α=4, a reuse factor of N=12 is needed to achieve, for example, 28 dB of S/I.

For this SNR (above the thermal noise), an RSSI of approximately −64 dBm is needed.

If it is assumed about 48 dB of propagation loss exist over the first meter of a Wi-Fi transmission in the 5 GHz band, it means that there is no value to transmit at a power level above −16 dBm (in case of 1m distance between the dock and the dockee) unless transmitting in the presence of interference above the thermal noise is allowed.

As the deployment of docks in an office environment is expected to be such that docked platforms (dockee) will not be at the cell edge, rather well inside the dock coverage, it is feasible to reduce the reuse factor (and the number of required channels) significantly, and possibly even further reduce the Tx power of the docks and dockees.

While the IEEE 802.11ax amendment allows reducing Tx power and increasing the "busy channel" threshold (for carrier-sense multiple Access (CS/MA) purposes), the standard does not address reducing the Tx power to levels below −10 dBm. This feature is called overlapping basic service set packet detect (OBSS-PD).

In one or more embodiments, a Wi-Fi based wireless docking system may facilitate two modes for docking—discovery mode and a dedicated "docking" whisper mode.

In the discovery mode the Tx power may be adjusted based on the environment sensing such that beacon frames can be heard at a distance of 3-5 meters at the "discovery data rate", this would allow a device (e.g., PC, or a phone) looking for a dock to discover the dock and start initiating pairing while the user is still walking to the dock. This will allow a much improved user experience (user can start work immediately). Since this Tx power will only be used in beacon frames and association process—the impact to neighboring docked cells will be negligible (and can be further reduced if a discovery channel is configured such that it is distinct from channels used for docking. Upon initiating a docking session, the dock device (e.g., docking stations 103, such as 103a and/or 103b) will enter whisper mode where it will perform the following steps (1) search for a channel (out of a possibly limited set of "allowed channels") in which the interference level is minimal, (2) select this channel as the operational channel, and (3) initiate the docking session on this channel, with a maximum Tx power that is targeting the minimum signal to interference plus noise ratio (SINR) required to maintain the target data rate within the docking session. This is while indicating to the dockee device (e.g., user devices 120) to mimic the dock device (e.g., docking station 103 such as 103a and/or 103b) in terms of maximum Tx power and CS/MA sensitivity—optimizing Tx power, data rate, and channel availability.

In one or more embodiments, a Wi-Fi based wireless docking system may facilitate having the dock (e.g., docking station(s) 103 such as 103a and/or 103b) adjust its maximum Tx power (in either only at the beginning of the session, periodically throughout the session, or continuously throughout the session) based on the receive (RX) SINR at the dock (e.g., docking station(s) 103 such as 103a and/or 103b), and medium access control (MAC) level block acknowledgment (BA) indications from the dockee so as to better maintain a stable data link at the required rate (with the minimal required max Tx power). In addition to adapting Tx power, the dock and dockee can also coordinate and optimize beamforming and antenna steering to optimize the docking experience.

In one or more embodiments, a Wi-Fi based wireless docking system may facilitate spectrum management.

In one or more embodiments, a Wi-Fi based wireless docking system may rely on the docks intelligently choosing a channel in a way to create the best channel reuse pattern between the docks. A possible enhancement is to allow for the channel used in each dock to be managed, either by being assigned by a central dock controller (e.g., "enterprise channel manager"), or in a more collaborative way by interaction between docks in order to determine a channel having an enhanced channel reuse pattern.

In an enterprise environment, docking stations (e.g., docking station(s) 103 such as 103a and/or 103b), similar to access points (e.g., APs 102), have fixed locations. It is therefore feasible to jointly pre-plan for the channel allocation of both docks and APs. This could be done by assigning a subset of channels to APs, and another subset to docks, where the specific channel user by a specific dock will be selected in an uncoordinated distributed way, as described above, or, the "enterprise channel manager" (currently one of the functions of an "access controller" entity) could directly assign the channels to the APs and the docks over their "enterprise network backbone" interface.

In the case of APs, this management is done over the enterprise wired LAN, in the case of docks, this could either be the enterprise wired LAN, or in case the docks are fully wireless, through the networked WLAN interface. The specific protocol used to control the docks could be based on existing specific enterprise access controller protocols (e.g., OMA-DM, TR69), or any other centralized management interface.

In one or more embodiments, a Wi-Fi based wireless docking system may dynamically allocate the channels to the docks in a collaborative way, using a new communication protocol between docks.

In one or more embodiments, the set of docks in the enterprise may be incorporated as nodes on a graph, where each dock is connected to a subset of the nodes in the network with a connection assigned a weight proportional to the distance or propagation loss between the two docks. A "discovery channel" may be defined, which all docks will initiate a respective wireless docking session with a respective dockee. All docks will transmit periodic "discovery beacons" at a known (pre-set or advertised) Tx power. The discovery beacons may be sent periodically at a predefined interval.

In one or more embodiments, each dock will listen to this discovery channel, and register the set of docks (graph nodes) it sees, and the signal propagation loss to the various docks.

In one or more embodiments, a Wi-Fi based wireless docking system may initiate a distributed "channel selection" algorithm in all docks, where docks will add to their discovery beacon an extra information (e.g., using an information element) on "target operational channel", and optionally an "expected interference level." Assuming the distributed channel selection algorithm convergences, the graph will reach a stable state, when the docks could each start working in their assigned channel.

The "discovery beacon" described above could be standardized or by using a general broadcast message with the protocol defined in the application layer.

In one or more embodiments, a Wi-Fi based wireless docking system may facilitate multi-dock scheduling. For example, to reduce interference between adjacent docks is to ensure mutually exclusive operation time for adjacent "dock cells." With the maximum data rate of a 2×2 160 MHz 802.11ax STA reaching 2.4 Gbps, it is feasible to time multiplex multiple docks in the same channel (by reference a single FHD 1980×1080 video stream @ 60 fps requires ~2.98 Gbps uncompressed, 995 Mbps with 4:2:2 YCbCr compression, and can go as low as a few 10s of Mbps for high quality compressed video). Assuming a reuse factor of 12 is needed but only three channels can be allocated to docking, it is possible to time multiplex 4 different docks on each channel, in a way to ensure that the minimum resulting SINR for any session at any time is the same as for a reuse factor of 12.

In one or more embodiments, a Wi-Fi based wireless docking system may facilitate synchronizing transmissions across the network to ensure the different sets of channels and docks (e.g., three channels that are time multiplexed for four different docks on each channel as explained above) are all time synchronized.

On the downlink (transmissions from the docks to the dockees), regardless of the way the actual synchronization and time slice allocation is defined, with the dock being a "dedicated device", the docks may initiate transmissions at the beginning of each downlink (DL) time slice.

On the uplink (transmissions from the dockees to the docks) transmissions may be limited to only be polled/triggered transmissions. One way to do this is to transition the dockees to operate in high efficiency (HE) multi-user (MU) mode, which relies on all UL transmissions to be triggered. For example, the dock would send a poll request frame to the dockee determining whether the dockee wants to dock. Similarly, a dock may send a trigger frame indicating resources that may be used by the dockee in order to dock.

In one or more embodiments, a Wi-Fi based wireless docking system may facilitate that all the dockees may be in sleep mode, using e.g., target wake time (TWT), outside of the allowed UL transmission intervals. In that manner, the dockees may preserve power.

There are multiple ways to assign time slices to the various dock/dockee sets, a prerequisite is to first synchronize the clocks of all the docks using, for example, the Wi-Fi Certified Time Sync capability (another way is to use methods similar to those used to synchronize Wi-Fi Aware clusters).

In one or more embodiments, a Wi-Fi based wireless docking system may utilize a network managed approach. For example, once the clocks of all the docks are synchronized, as channels are centrally to docks (e.g., using a central dock controller (e.g., "enterprise channel manager")), timeslots may be similarly allocated to docks.

In one or more embodiments, a Wi-Fi based wireless docking system may utilize a distributed approach. For example, using an algorithm to calculate channel and time-slice pairs.

In one or more embodiments, a Wi-Fi based wireless docking system may use an HE triggered direct, where a Wi-Fi AP may trigger transmissions on a sub-network, or a P2P operation in the AP channel. This may result in having a controlling AP triggering a dock operation in accordance with required allocations.

In a first example, for a 60 frames per second (fps), and a time reuse factor of four, it may be possible to allocate 4.166 millisecond (mSec) for each "time slice," start the time slice with transmitting any required DL data (e.g., human interface device (HID) info), and then trigger the UL display frame update. The actual delay between two transmissions will be 16.666 mSec.

In a second example, in case faster HID response time is needed, the first part of each 4.166 mSec slice may be allocated for DL HID transmissions (e.g., 0.1666 mSec for each of the 4 slices), followed by a 3.5 mSec time slice allocated for UL transmissions. This way, the DL latency will be 4.166 mSec and the UL frame rate would still meet the required 60 fps.

In one or more embodiments, a Wi-Fi based wireless docking system may use of dual concurrent connection. As part of the overall docking solution, docks can utilize concurrent connection solutions and establish two connections between the dockee (e.g., a user device 120) and the dock 103a and/or 103b at the same time. This will enable higher overall throughput with the dock, improve the robustness of the links and lower latency (can always choose the channel that is "ready" to use the air). It will also improve the overall quality of service by allocating low latency tasks to one stream and background tasks to the other. As an example, low latency channel for the camera connected to the dock and high latency for background file download to HDD connected to the dock. It is understood that the above descriptions are for purposes of illustration and are not meant to be limiting.

Figure 2:
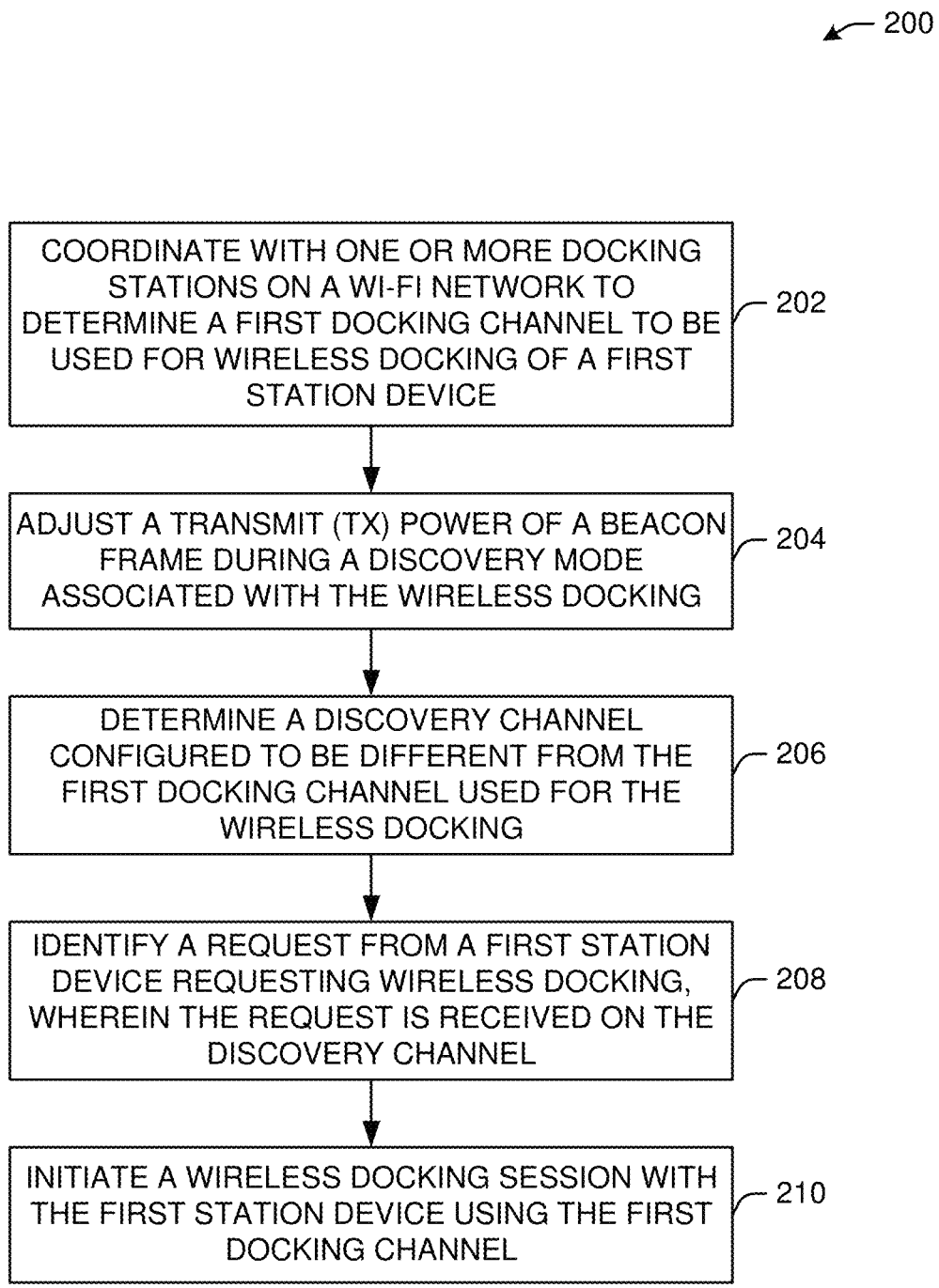
FIG. 2 illustrates a flow diagram of illustrative process for an illustrative Wi-Fi based wireless docking system, in accordance with one or more example embodiments of the present disclosure.

FIG. 2 illustrates a flow diagram of illustrative process 200 for an illustrative Wi-Fi based wireless docking system, in accordance with one or more example embodiments of the present disclosure.

At block 202, a device (e.g., the user device(s) 120 and/or the AP 102 of FIG. 1) may coordinate with one or more docking stations on a Wi-Fi network to determine a first docking channel to be used for wireless docking of a first station device. Coordinating with one or more docking stations further comprises the processing circuitry being configured to time synchronize transmissions across the network with the one or more docking stations, coordinate channels with the one or more docking stations, or coordinate transmit power with the one or more docking stations.

At block 204, the device may adjust a transmit (TX) power of a beacon frame during a discovery mode associated with the wireless docking. The beacon frame is part of a periodic discovery beacons, wherein the periodic discovery beacons are sent at a predefined interval.

At block 206, the device may determine a discovery channel configured to be different from the first docking channel used for the wireless docking. The discovery channel is assigned by a central dock controller, wherein the central dock controller controls one or more docking stations.

At block 208, the device may identify a request from a first station device requesting wireless docking, wherein the request is received on the discovery channel.

At block 210, the device may initiate a wireless docking session with the first station device using the first docking channel. Initiating a wireless docking session comprises initiating pairing with the first station device. Pairing with the first station device may be performed while a user operating the first station device is walking.

It is understood that the above descriptions are for purposes of illustration and are not meant to be limiting.

FIG. 3 shows a functional diagram of an exemplary communication station 300 in accordance with some embodiments. In one embodiment, FIG. 3 illustrates a functional block diagram of a communication station that may be suitable for use as an AP 102 (FIG. 1) or user device 120 (FIG. 1) in accordance with some embodiments. The communication station 300 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 300 may include communications circuitry 302 and a transceiver 310 for transmitting and receiving signals to and from other communication stations using one or more antennas 301. The transceiver 310 may be a device comprising both a transmitter and a receiver that are combined and share common circuitry (e.g., communication circuitry 302). The communication circuitry 302 may include amplifiers, filters, mixers, analog to digital and/or digital to analog converters. The transceiver 310 may transmit and receive analog or digital signals. The transceiver 310 may allow reception of signals during transmission periods. This mode is known as full-duplex, and may require the transmitter and receiver to operate on different frequencies to minimize interference between the transmitted signal and the received signal. The transceiver 310 may operate in a half-duplex mode, where the transceiver 310 may transmit or receive signals in one direction at a time.

The communications circuitry 302 may include circuitry that can operate the physical layer (PHY) communications and/or medium access control (MAC) communications for controlling access to the wireless medium, and/or any other communications layers for transmitting and receiving signals. The communication station 300 may also include processing circuitry 306 and memory 308 arranged to perform the operations described herein. In some embodiments, the communications circuitry 302 and the processing circuitry 306 may be configured to perform operations detailed in FIGS. 1-2.

In accordance with some embodiments, the communications circuitry 302 may be arranged to contend for a wireless medium and configure frames or packets for communicating over the wireless medium. The communications circuitry 302 may be arranged to transmit and receive signals. The communications circuitry 302 may also include circuitry for modulation/demodulation, upconversion/downconversion, filtering, amplification, etc. In some embodiments, the processing circuitry 306 of the communication station 300 may include one or more processors. In other embodiments, one or more antennas 301 may be coupled to the communications circuitry 302 arranged for sending and receiving signals. The memory 308 may store information for configuring the processing circuitry 306 to perform operations for configuring and transmitting message frames and performing the various operations described herein. The memory 308 may include any type of memory, including non-transitory memory, for storing information in a form readable by a machine (e.g., a computer). For example, the memory 308 may include a computer-readable storage device, read-only memory (ROM), random-access memory (RAM), magnetic disk storage media, optical storage media, flash-memory devices and other storage devices and media.

In some embodiments, the communication station 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 300 may include one or more antennas 301. The antennas 301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 300 may include one or more of a keyboard, a display, a non-volatile memory port, multiple antennas, a graphics processor, an application processor, speakers, and other mobile device elements. The display may be an LCD screen including a touch screen.

Although the communication station 300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 300 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 300 may include one or more processors and may be configured with instructions stored on a computer-readable storage device memory.

FIG. 4 illustrates a block diagram of an example of a machine 400 or system upon which any one or more of the techniques (e.g., methodologies) discussed herein may be performed. In other embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environments. The machine 400 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware)

capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a power management device 432, a graphics display device 410, an alphanumeric input device 412 (e.g., a keyboard), and a user interface (UI) navigation device 414 (e.g., a mouse). In an example, the graphics display device 410, alphanumeric input device 412, and UI navigation device 414 may be a touch screen display. The machine 400 may additionally include a storage device (i.e., drive unit) 416, a signal generation device 418 (e.g., a speaker), a Wi-Fi based wireless docking device 419, a network interface device/transceiver 420 coupled to antenna(s) 430, and one or more sensors 428, such as a global positioning system (GPS) sensor, a compass, an accelerometer, or other sensor. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

The Wi-Fi based wireless docking device 419 may carry out or perform any of the operations and processes (e.g., processes 400 and 402) described and shown above. For example, the Wi-Fi based wireless docking device 419 may be configured to enable Wi-Fi based wireless docking in dense environments such as enterprises. This may be achieved by facilitating building a comprehensive Wi-Fi based docking roadmap. The target is to first enable one or more mechanisms where both the user platform and the wireless dock are designed using Wi-Fi technology, however, this embodiments of this disclosure are not limited to Wi-Fi.

The Wi-Fi based wireless docking device 419 may be applicable to wireless virtual reality experience. Some of the benefits of the Wi-Fi based wireless docking system may facilitate low latency and high bandwidth wireless experience.

While the Wi-Fi based wireless docking device 419 is described in the context of wireless docks, it is easy to envision and apply the same set of enablers to any large set of managed peer-to-peer communication devices. It should further be noted that as some of the embodiments described in this disclosure rely on the devices having quality of service (QoS) requirements (e.g., for scheduled methods).

The Wi-Fi based wireless docking device 419 may be expanded to relate to more than just device pairs, as long as for each set of devices a "master device" (referred to herein as the "dock"), and several "slave devices" (referred to herein as the "dockee") may be defined. The Wi-Fi based wireless docking system may also be extended to support improved coexistence between different wireless technologies utilizing the same spectrum like Wi-Fi, Bluetooth (BT), cellular (e.g., LTE, 5G, or the like).

The Wi-Fi based wireless docking device 419 may improve dock discovery and connection key performance indicators (KPIs) by using reduced transmit (TX) power to advertise the dock when it is not in use such that it is only discovered when the PC/phone looking for a dock is nearby.

The Wi-Fi based wireless docking device 419 may use environmental sensing to dynamically reduce the Wi-Fi transmit power to minimize interruption to same channel neighboring docks or networks. In addition, the sensing will be used to improve the beam forming and antenna steering (or other digital, analog, and mechanical methods) for better alignment with the dock The Wi-Fi based wireless docking device 419 may facilitate a novel spectrum management solution that allows allocation and reservation of spectrum for dock-PC pairs (distributed/AP managed)

The Wi-Fi based wireless docking device 419 may facilitate a novel scheduling technique that builds upon 802.11ax primitives to optimize the experience in dense environment by AP scheduling air time for pairs of devices.

The Wi-Fi based wireless docking device 419 may facilitate utilization of concurrent connections (with and dual radio architecture, such as concurrent dual band, triple band dual concurrency, or simultaneous multi-channel) to optimize the docking experience by shaping the traffic using both connections.

It is understood that the above are only a subset of what the Wi-Fi based wireless docking device 419 may be configured to perform and that other functions included throughout this disclosure may also be performed by the Wi-Fi based wireless docking device 419.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 5:
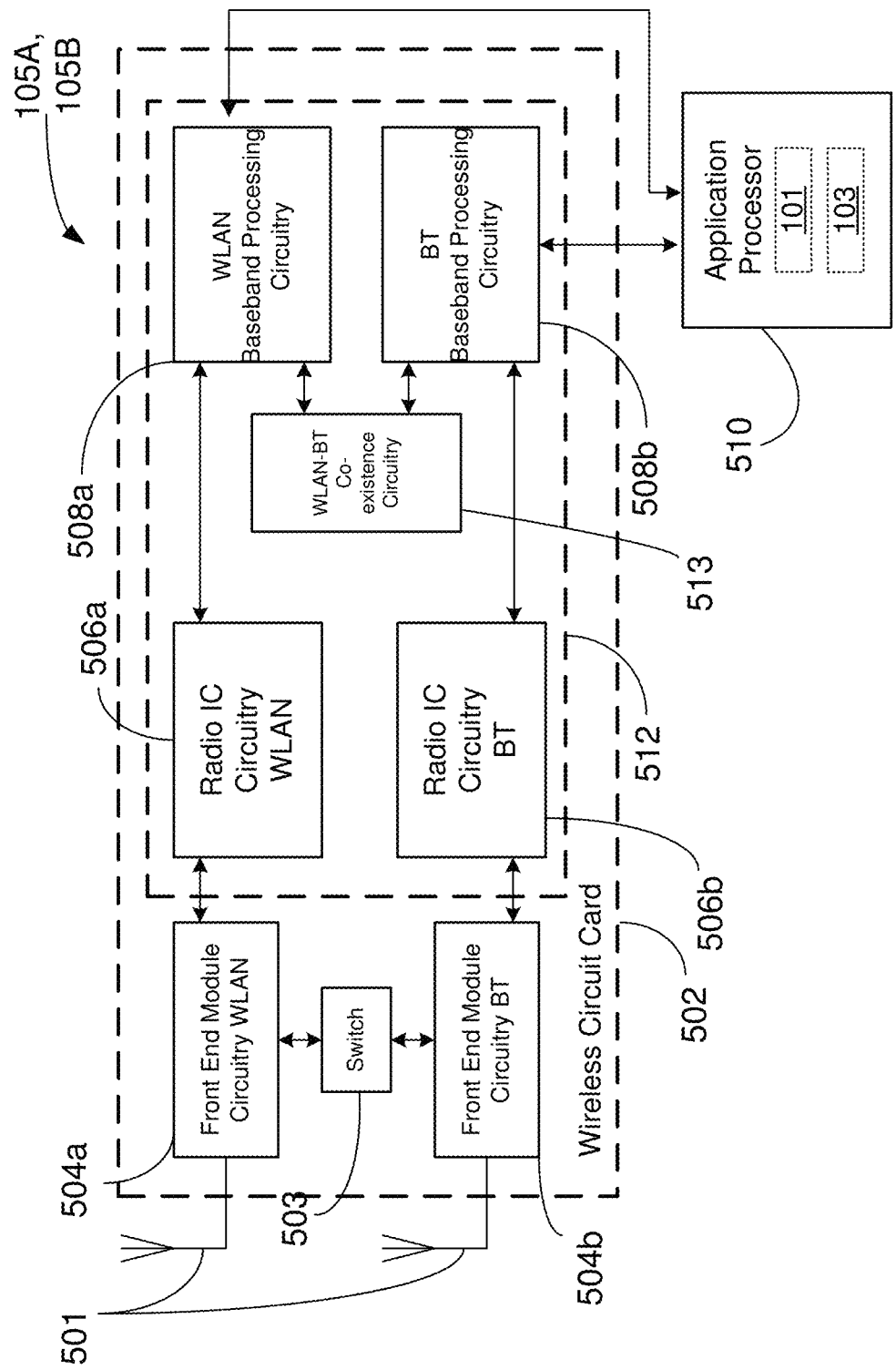
FIG. 5 is a block diagram of a radio architecture in accordance with some examples.

FIG. 5 is a block diagram of a radio architecture 105A, 105B in accordance with some embodiments that may be implemented in any one of the example AP 102 and/or the example user device 120 of FIG. 1. Radio architecture 105A, 105B may include radio front-end module (FEM) circuitry 504a-b, radio IC circuitry 506a-b and baseband processing circuitry 508a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 504a-b may include a WLAN or Wi-Fi FEM circuitry 504a and a Bluetooth (BT) FEM circuitry 504b. The WLAN FEM circuitry 504a may include a receive signal path comprising circuitry configured to operate on WLAN RF signals received from one or more antennas 501, to amplify the received signals and to provide the amplified versions of the received signals to the WLAN radio IC circuitry 506a for further processing. The BT FEM circuitry 504b may include a receive signal path which may include circuitry configured to operate on BT RF signals received from one or more antennas 501, to amplify the received signals and to provide the amplified versions of the received signals to the BT radio IC circuitry 506b for further processing. FEM circuitry 504a may also include a transmit signal path which may include circuitry configured to amplify WLAN signals provided by the radio IC circuitry 506a for wireless transmission by one or more of the antennas 501. In addition, FEM circuitry 504b may also include a transmit signal path which may include circuitry configured to amplify BT signals provided by the radio IC circuitry 506b for wireless transmission by the one or more antennas. In the embodiment of FIG. 5, although FEM 504a and FEM 504b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 506a-b as shown may include WLAN radio IC circuitry 506a and BT radio IC circuitry 506b. The WLAN radio IC circuitry 506a may include a receive signal path which may include circuitry to down-convert WLAN RF signals received from the FEM circuitry 504a and provide baseband signals to WLAN baseband processing circuitry 508a. BT radio IC circuitry 506b may in turn include a receive signal path which may include circuitry to down-convert BT RF signals received from the FEM circuitry 504b and provide baseband signals to BT baseband processing circuitry 508b. WLAN radio IC circuitry 506a may also include a transmit signal path which may include circuitry to up-convert WLAN baseband signals provided by the WLAN baseband processing circuitry 508a and provide WLAN RF output signals to the FEM circuitry 504a for subsequent wireless transmission by the one or more antennas 501. BT radio IC circuitry 506b may also include a transmit signal path which may include circuitry to up-convert BT baseband signals provided by the BT baseband processing circuitry 508b and provide BT RF output signals to the FEM circuitry 504b for subsequent wireless transmission by the one or more antennas 501. In the embodiment of FIG. 5, although radio IC circuitries 506a and 506b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 508a-b may include a WLAN baseband processing circuitry 508a and a BT baseband processing circuitry 508b. The WLAN baseband processing circuitry 508a may include a memory, such as, for example, a set of RAM arrays in a Fast Fourier Transform or Inverse Fast Fourier Transform block (not shown) of the WLAN baseband processing circuitry 508a. Each of the WLAN baseband circuitry 508a and the BT baseband circuitry 508b may further include one or more processors and control logic to process the signals received from the corresponding WLAN or BT receive signal path of the radio IC circuitry 506a-b, and to also generate corresponding WLAN or BT baseband signals for the transmit signal path of the radio IC circuitry 506a-b. Each of the baseband processing circuitries 508a and 508b may further include physical layer (PHY) and medium access control layer (MAC) circuitry, and may further interface with a device for generation and processing of the baseband signals and for controlling operations of the radio IC circuitry 506a-b.

Referring still to FIG. 5, according to the shown embodiment, WLAN-BT coexistence circuitry 513 may include logic providing an interface between the WLAN baseband circuitry 508a and the BT baseband circuitry 508b to enable use cases requiring WLAN and BT coexistence. In addition, a switch 503 may be provided between the WLAN FEM circuitry 504a and the BT FEM circuitry 504b to allow switching between the WLAN and BT radios according to application needs. In addition, although the antennas 501 are depicted as being respectively connected to the WLAN FEM circuitry 504a and the BT FEM circuitry 504b, embodiments include within their scope the sharing of one or more antennas as between the WLAN and BT FEMs, or the provision of more than one antenna connected to each of FEM 504a or 504b.

In some embodiments, the front-end module circuitry 504a-b, the radio IC circuitry 506a-b, and baseband processing circuitry 508a-b may be provided on a single radio card, such as wireless radio card 502. In some other embodiments, the one or more antennas 501, the FEM circuitry 504a-b and the radio IC circuitry 506a-b may be provided on a single radio card. In some other embodiments, the radio IC circuitry 506a-b and the baseband processing circuitry 508a-b may be provided on a single chip or integrated circuit (IC), such as IC 512.

In some embodiments, the wireless radio card 502 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

Figure 6:
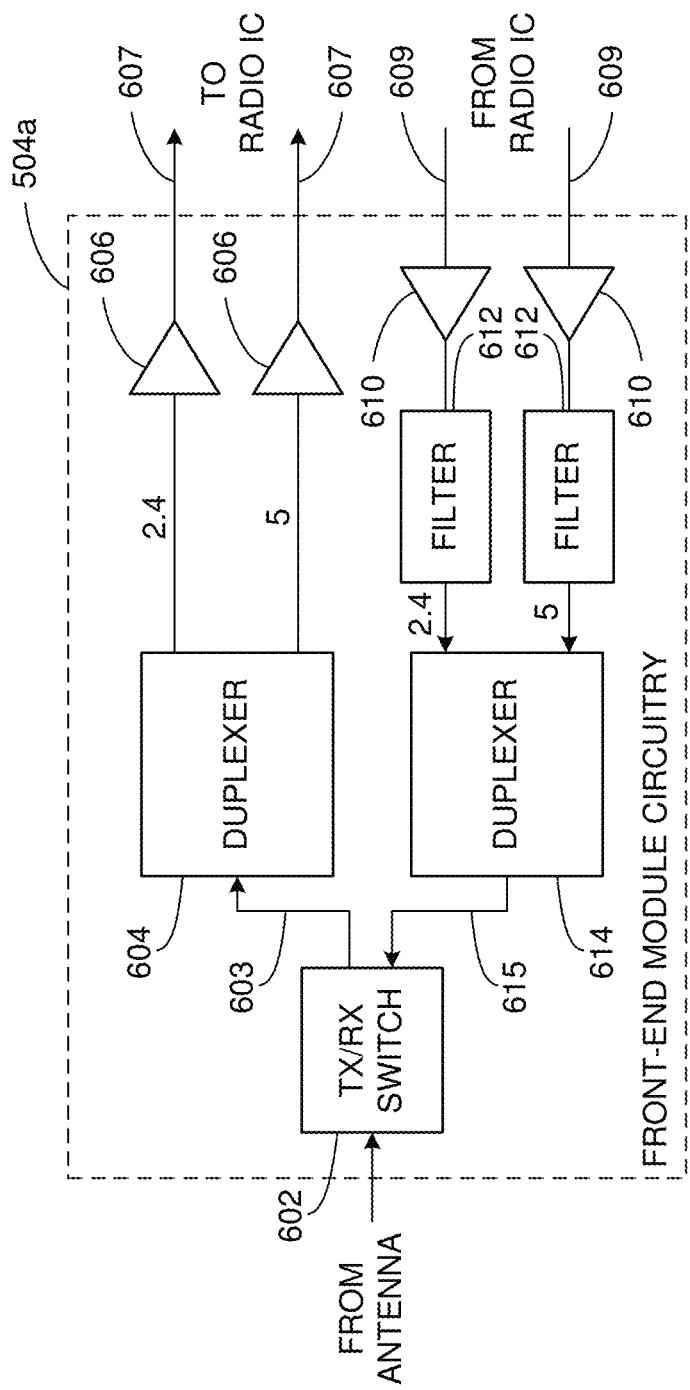
FIG. 6 illustrates an example front-end module circuitry for use in the radio architecture of FIG. 5, in accordance with one or more example embodiments of the present disclosure.

In some embodiments, as further shown in FIG. 6, the BT baseband circuitry 508b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

FIG. 6 illustrates WLAN FEM circuitry 504a in accordance with some embodiments. Although the example of FIG. 6 is described in conjunction with the WLAN FEM circuitry 504a, the example of FIG. 6 may be described in conjunction with the example BT FEM circuitry 504b (FIG. 5), although other circuitry configurations may also be suitable.

In some embodiments, the FEM circuitry 504a may include a TX/RX switch 602 to switch between transmit mode and receive mode operation. The FEM circuitry 504a may include a receive signal path and a transmit signal path. The receive signal path of the FEM circuitry 504a may include a low-noise amplifier (LNA) 606 to amplify received RF signals 603 and provide the amplified received RF signals 607 as an output (e.g., to the radio IC circuitry 506a-b (FIG. 5)). The transmit signal path of the circuitry 504a may include a power amplifier (PA) to amplify input RF signals 609 (e.g., provided by the radio IC circuitry 506a-b), and one or more filters 612, such as band-pass filters (BPFs), low-pass filters (LPFs) or other types of filters, to generate RF signals 615 for subsequent transmission (e.g., by one or more of the antennas 501 (FIG. 5)) via an example duplexer 614.

In some dual-mode embodiments for Wi-Fi communication, the FEM circuitry 504a may be configured to operate in either the 2.4 GHz frequency spectrum or the 5 GHz frequency spectrum. In these embodiments, the receive signal path of the FEM circuitry 504a may include a receive signal path duplexer 604 to separate the signals from each spectrum as well as provide a separate LNA 606 for each spectrum as shown. In these embodiments, the transmit signal path of the FEM circuitry 504a may also include a power amplifier 610 and a filter 612, such as a BPF, an LPF or another type of filter for each frequency spectrum and a transmit signal path duplexer 604 to provide the signals of one of the different spectrums onto a single transmit path for subsequent transmission by the one or more of the antennas 501 (FIG. 5). In some embodiments, BT communications may utilize the 2.4 GHz signal paths and may utilize the same FEM circuitry 504a as the one used for WLAN communications.

Figure 7:
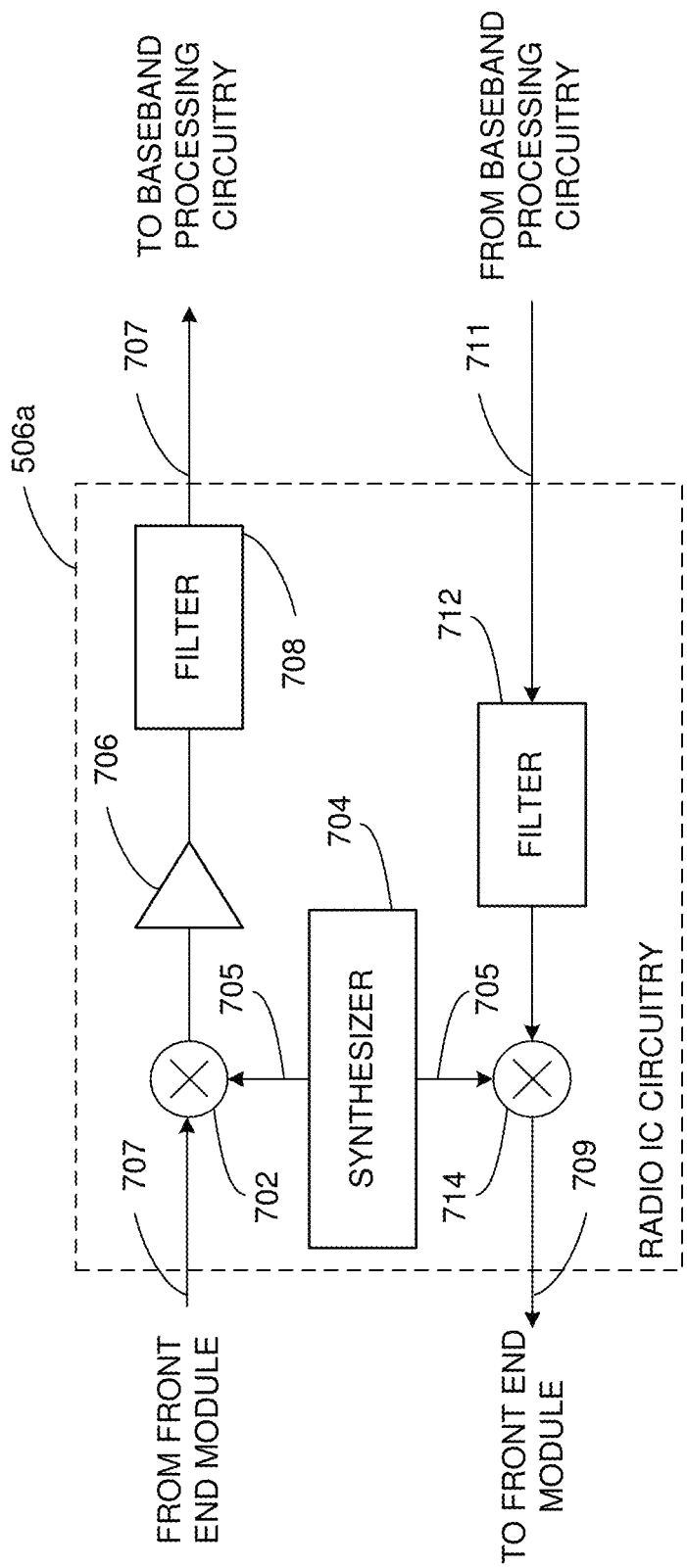
FIG. 7 illustrates an example radio IC circuitry for use in the radio architecture of FIG. 5, in accordance with one or more example embodiments of the present disclosure.

FIG. 7 illustrates radio IC circuitry 506a in accordance with some embodiments. The radio IC circuitry 506a is one example of circuitry that may be suitable for use as the WLAN or BT radio IC circuitry 506a/506b (FIG. 5), although other circuitry configurations may also be suitable. Alternatively, the example of FIG. 7 may be described in conjunction with the example BT radio IC circuitry 506b.

In some embodiments, the radio IC circuitry 506a may include a receive signal path and a transmit signal path. The receive signal path of the radio IC circuitry 506a may include at least mixer circuitry 702, such as, for example, down-conversion mixer circuitry, amplifier circuitry 706 and filter circuitry 708. The transmit signal path of the radio IC circuitry 506a may include at least filter circuitry 712 and mixer circuitry 714, such as, for example, up-conversion mixer circuitry. Radio IC circuitry 506a may also include synthesizer circuitry 704 for synthesizing a frequency 705 for use by the mixer circuitry 702 and the mixer circuitry 714. The mixer circuitry 702 and/or 714 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 7 illustrates only a simplified version of a radio IC circuitry, and may include, although not shown, embodiments where each of the depicted circuitries may include more than one component. For instance, mixer circuitry 714 may each include one or more mixers, and filter circuitries 708 and/or 712 may each include one or more filters, such as one or more BPFs and/or LPFs according to application needs. For example, when mixer circuitries are of the direct-conversion type, they may each include two or more mixers.

In some embodiments, mixer circuitry 702 may be configured to down-convert RF signals 607 received from the FEM circuitry 504a-b (FIG. 5) based on the synthesized frequency 705 provided by synthesizer circuitry 704. The amplifier circuitry 706 may be configured to amplify the down-converted signals and the filter circuitry 708 may include an LPF configured to remove unwanted signals from the down-converted signals to generate output baseband signals 707. Output baseband signals 707 may be provided to the baseband processing circuitry 508a-b (FIG. 5) for further processing. In some embodiments, the output baseband signals 707 may be zero-frequency baseband signals, although this is not a requirement. In some embodiments, mixer circuitry 702 may comprise passive mixers, although the scope of the embodiments is not limited in this respect.

In some embodiments, the mixer circuitry 714 may be configured to up-convert input baseband signals 711 based on the synthesized frequency 705 provided by the synthesizer circuitry 704 to generate RF output signals 609 for the FEM circuitry 504a-b. The baseband signals 711 may be provided by the baseband processing circuitry 508a-b and may be filtered by filter circuitry 712. The filter circuitry 712 may include an LPF or a BPF, although the scope of the embodiments is not limited in this respect.

In some embodiments, the mixer circuitry 702 and the mixer circuitry 714 may each include two or more mixers and may be arranged for quadrature down-conversion and/or up-conversion respectively with the help of synthesizer 704. In some embodiments, the mixer circuitry 702 and the mixer circuitry 714 may each include two or more mixers each configured for image rejection (e.g., Hartley image rejection). In some embodiments, the mixer circuitry 702 and the mixer circuitry 714 may be arranged for direct down-conversion and/or direct up-conversion, respectively. In some embodiments, the mixer circuitry 702 and the mixer circuitry 714 may be configured for super-heterodyne operation, although this is not a requirement.

Mixer circuitry 702 may comprise, according to one embodiment: quadrature passive mixers (e.g., for the in-phase (I) and quadrature phase (Q) paths). In such an embodiment, RF input signal 607 from FIG. 7 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 705 of synthesizer 704 (FIG. 7). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 607 (FIG. 6) may comprise a balanced signal, although the scope of the embodiments is not limited in this respect. The I and Q baseband output signals may be provided to low-noise amplifier, such as amplifier circuitry 706 (FIG. 7) or to filter circuitry 708 (FIG. 7).

In some embodiments, the output baseband signals 707 and the input baseband signals 711 may be analog baseband signals, although the scope of the embodiments is not limited in this respect. In some alternate embodiments, the output baseband signals 707 and the input baseband signals 711 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 704 may be a fractional-N synthesizer or a fractional N/N+1 synthesizer, although the scope of the embodiments is not limited in this respect as other types of frequency synthesizers may be suitable. For example, synthesizer circuitry 704 may be a delta-sigma synthesizer, a frequency multiplier, or a synthesizer comprising a phase-locked loop with a frequency divider. According to some embodiments, the synthesizer circuitry 704 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 704 may be provided by a voltage controlled oscillator (VCO), although that is not a requirement. A divider control input may further be provided by either the baseband processing circuitry 508a-b (FIG. 5) depending on the desired output frequency 705. In some embodiments, a divider control input (e.g., N) may be determined from a look-up table (e.g., within a Wi-Fi card) based on a channel number and a channel center frequency as determined or indicated by the example application processor 510. The application processor 510 may include, or otherwise be connected to, one of the example secure signal converter 101 or the example received signal converter 103 (e.g., depending on which device the example radio architecture is implemented in).

In some embodiments, synthesizer circuitry 704 may be configured to generate a carrier frequency as the output frequency 705, while in other embodiments, the output frequency 705 may be a fraction of the carrier frequency (e.g., one-half the carrier frequency, one-third the carrier frequency). In some embodiments, the output frequency 705 may be a LO frequency (fLO).

Figure 8:
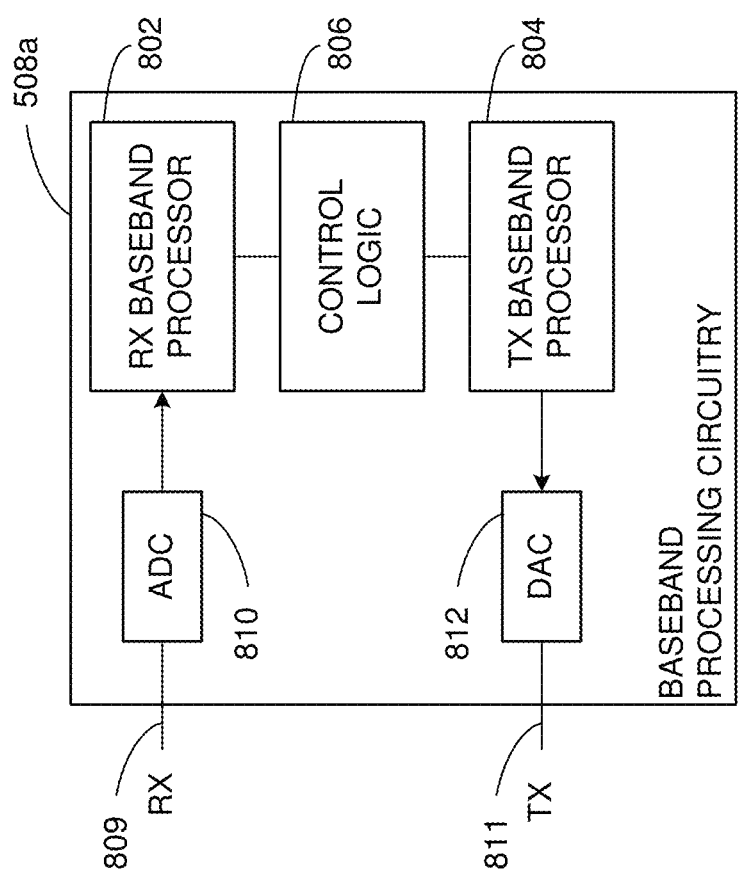
FIG. 8 illustrates an example baseband processing circuitry for use in the radio architecture of FIG. 5, in accordance with one or more example embodiments of the present disclosure.

FIG. 8 illustrates a functional block diagram of baseband processing circuitry 508a in accordance with some embodiments. The baseband processing circuitry 508a is one example of circuitry that may be suitable for use as the baseband processing circuitry 508a (FIG. 5), although other circuitry configurations may also be suitable. Alternatively, the example of FIG. 7 may be used to implement the example BT baseband processing circuitry 508b of FIG. 5.

The baseband processing circuitry 508a may include a receive baseband processor (RX BBP) 802 for processing receive baseband signals 709 provided by the radio IC circuitry 506a-b (FIG. 5) and a transmit baseband processor (TX BBP) 804 for generating transmit baseband signals 711 for the radio IC circuitry 506a-b. The baseband processing circuitry 508a may also include control logic 806 for coordinating the operations of the baseband processing circuitry 508a.

In some embodiments (e.g., when analog baseband signals are exchanged between the baseband processing circuitry 508a-b and the radio IC circuitry 506a-b), the baseband processing circuitry 508a may include ADC 810 to convert analog baseband signals 809 received from the radio IC circuitry 506a-b to digital baseband signals for processing by the RX BBP 802. In these embodiments, the baseband processing circuitry 508a may also include DAC 812 to convert digital baseband signals from the TX BBP 804 to analog baseband signals 811.

In some embodiments that communicate OFDM signals or OFDMA signals, such as through baseband processor 508a, the transmit baseband processor 804 may be configured to generate OFDM or OFDMA signals as appropriate for transmission by performing an inverse fast Fourier transform (IFFT). The receive baseband processor 802 may be configured to process received OFDM signals or OFDMA signals by performing an FFT. In some embodiments, the receive baseband processor 802 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 5, in some embodiments, the antennas 501 (FIG. 5) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 501 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: coordinate with one or more docking stations on a Wi-Fi network to determine a first docking channel to be used for wireless docking of a first station device; adjust a transmit (TX) power of a beacon frame during a discovery mode associated with the wireless docking; determine a discovery channel configured to be different from the first docking channel used for the wireless docking; identify a request from a first station device requesting wireless docking, wherein the request may be received on the discovery channel; and initiate a wireless docking session with the first station device using the first docking channel.

Example 2 may include the device of example 1 and/or some other example herein, wherein the discovery channel may be assigned by a central dock controller, wherein the central dock controller controls one or more docking stations.

Example 3 may include the device of example 1 and/or some other example herein, wherein initiating a wireless docking session comprises the processing circuitry further configured to initiate pairing with the first station device.

Example 4 may include the device of example 3 and/or some other example herein, wherein to initiate pairing with the first station device may be performed while a user operating the first station device may be walking.

Example 5 may include the device of example 1 and/or some other example herein, wherein the beacon frame may be part of a periodic discovery beacons, wherein the periodic discovery beacons are sent at a predefined interval.

Example 6 may include the device of example 1 and/or some other example herein, wherein coordinating with one or more docking stations further comprises the processing circuitry being configured to time synchronize transmissions across the network with the one or more docking stations, coordinate channels with the one or more docking stations, or coordinate transmit power with the one or more docking stations.

Example 7 may include the device of example 1 and/or some other example herein, further comprising a transceiver configured to cause the transmission and reception of wireless signals associated with the wireless docking session.

Example 8 may include the device of example 7 and/or some other example herein, further comprising an antenna coupled to the transceiver to cause to send the frame.

Example 9 may include a non-transitory computer-readable medium storing computer-executable instructions which when executed by one or more processors result in performing operations comprising: coordinating with one or more docking stations on a Wi-Fi network to determine a first docking channel to be used for wireless docking of a first station device; adjusting a transmit (TX) power of a beacon frame during a discovery mode associated with the wireless docking; determining a discovery channel configured to be different from the first docking channel used for the wireless docking; identifying a request from a first station device requesting wireless docking, wherein the request may be received on the discovery channel; and initiating a wireless docking session with the first station device using the first docking channel.

Example 10 may include the non-transitory computer-readable medium of example 9 and/or some other example herein, wherein the discovery channel may be assigned by a central dock controller, wherein the central dock controller controls one or more docking stations.

Example 11 may include the non-transitory computer-readable medium of example 9 and/or some other example herein, wherein initiating a wireless docking session comprises the processing circuitry further configured to initiate pairing with the first station device.

Example 12 may include the non-transitory computer-readable medium of example 11 and/or some other example herein, wherein to initiate pairing with the first station device may be performed while a user operating the first station device may be walking.

Example 13 may include the non-transitory computer-readable medium of example 9 and/or some other example herein, wherein the beacon frame may be part of a periodic discovery beacons, wherein the periodic discovery beacons are sent at a predefined interval.

Example 14 may include the non-transitory computer-readable medium of example 9 and/or some other example herein, wherein coordinating with one or more docking stations further comprises the processing circuitry being configured to time synchronize transmissions across the network with the one or more docking stations, coordinate channels with the one or more docking stations, or coordinate transmit power with the one or more docking stations.

Example 15 may include a method comprising: coordinating with one or more docking stations on a Wi-Fi network to determine a first docking channel to be used for wireless docking of a first station device; adjusting a transmit (TX) power of a beacon frame during a discovery mode associated with the wireless docking; determining a discovery channel configured to be different from the first docking channel used for the wireless docking; identifying a request from a first station device requesting wireless docking, wherein the request may be received on the discovery channel; and initiating a wireless docking session with the first station device using the first docking channel.

Example 16 may include the method of example 15 and/or some other example herein, wherein the discovery channel may be assigned by a central dock controller, wherein the central dock controller controls one or more docking stations.

Example 17 may include the method of example 15 and/or some other example herein, wherein initiating a wireless docking session comprises the processing circuitry further configured to initiate pairing with the first station device.

Example 18 may include the method of example 17 and/or some other example herein, wherein to initiate pairing with the first station device may be performed while a user operating the first station device may be walking.

Example 19 may include the method of example 15 and/or some other example herein, wherein the beacon frame may be part of a periodic discovery beacons, wherein the periodic discovery beacons are sent at a predefined interval.

Example 20 may include the method of example 15 and/or some other example herein, wherein coordinating with one or more docking stations further comprises the processing circuitry being configured to time synchronize transmissions across the network with the one or more docking stations, coordinate channels with the one or more docking stations, or coordinate transmit power with the one or more docking stations.

Example 21 may include an apparatus comprising means for: coordinating with one or more docking stations on a Wi-Fi network to determine a first docking channel to be used for wireless docking of a first station device; adjusting a transmit (TX) power of a beacon frame during a discovery mode associated with the wireless docking; determining a discovery channel configured to be different from the first docking channel used for the wireless docking; identifying a request from a first station device requesting wireless docking, wherein the request may be received on the discovery channel; and initiating a wireless docking session with the first station device using the first docking channel.

Example 22 may include the apparatus of example 21 and/or some other example herein, wherein the discovery channel may be assigned by a central dock controller, wherein the central dock controller controls one or more docking stations.

Example 23 may include the apparatus of example 21 and/or some other example herein, wherein initiating a wireless docking session comprises the processing circuitry further configured to initiate pairing with the first station device.

Example 24 may include the apparatus of example 21 and/or some other example herein, wherein to initiate pairing with the first station device may be performed while a user operating the first station device may be walking.

Example 25 may include the apparatus of example 21 and/or some other example herein, wherein the beacon frame may be part of a periodic discovery beacons, wherein the periodic discovery beacons are sent at a predefined interval.

Example 26 may include the apparatus of example 21 and/or some other example herein, wherein coordinating with one or more docking stations further comprises the processing circuitry being configured to time synchronize transmissions across the network with the one or more docking stations, coordinate channels with the one or more docking stations, or coordinate transmit power with the one or more docking stations.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   coordinate with one or more docking stations on a Wi-Fi network to determine a first docking channel to be used for wireless docking of a first station device;
   adjust a transmit (TX) power of a beacon frame during a discovery mode associated with the wireless docking;
   determine a discovery channel configured to be different from the first docking channel used for the wireless docking;
   identify a request from a first station device requesting wireless docking, wherein the request is received on the discovery channel; and
   initiate a wireless docking session with the first station device using the first docking channel.

2. The device of claim 1, wherein the discovery channel is assigned by a central dock controller, wherein the central dock controller controls one or more docking stations.

3. The device of claim 1, wherein initiating a wireless docking session comprises the processing circuitry further configured to initiate pairing with the first station device.

4. The device of claim 3, wherein to initiate pairing with the first station device is performed while a user operating the first station device is walking.

5. The device of claim 1, wherein the beacon frame is part of a periodic discovery beacons, wherein the periodic discovery beacons are sent at a predefined interval.

6. The device of claim 1, wherein coordinating with one or more docking stations further comprises the processing circuitry being configured to time synchronize transmissions across the network with the one or more docking stations, coordinate channels with the one or more docking stations, or coordinate transmit power with the one or more docking stations.

7. The device of claim 1, further comprising a transceiver configured to cause the transmission and reception of wireless signals associated with the wireless docking session.

8. The device of claim 7, further comprising an antenna coupled to the transceiver to cause to send the frame.

9. A non-transitory computer-readable medium storing computer-executable instructions which when executed by one or more processors result in performing operations comprising:
coordinating with one or more docking stations on a Wi-Fi network to determine a first docking channel to be used for wireless docking of a first station device;
adjusting a transmit (TX) power of a beacon frame during a discovery mode associated with the wireless docking;
determining a discovery channel configured to be different from the first docking channel used for the wireless docking;
identifying a request from a first station device requesting wireless docking, wherein the request is received on the discovery channel; and
initiating a wireless docking session with the first station device using the first docking channel.

10. The non-transitory computer-readable medium of claim 9, wherein the discovery channel is assigned by a central dock controller, wherein the central dock controller controls one or more docking stations.

11. The non-transitory computer-readable medium of claim 9, wherein initiating a wireless docking session further comprising operations to initiate pairing with the first station device.

12. The non-transitory computer-readable medium of claim 11, wherein to initiate pairing with the first station device is performed while a user operating the first station device is walking.

13. The non-transitory computer-readable medium of claim 9, wherein the beacon frame is part of a periodic discovery beacons, wherein the periodic discovery beacons are sent at a predefined interval.

14. The non-transitory computer-readable medium of claim 9, wherein coordinating with one or more docking stations further comprising operations to time synchronize transmissions across the network with the one or more clocking stations, coordinate channels with the one or more docking stations, or coordinate transmit power with the one or more docking stations.

15. A method comprising:
coordinating, by one or more processors, with one or more docking stations on a Wi-Fi network to determine a first docking channel to be used for wireless docking of a first station device;
adjusting a transmit (TX) power of a beacon frame during a discovery mode associated with the wireless docking;
determining a discovery channel configured to be different from the first docking channel used for the wireless docking;
identifying a request from a first station device requesting wireless docking, wherein the request is received on the discovery channel; and
initiating a wireless docking session with the first station device using the first docking channel.

16. The method of claim 15, further comprising assigning the first docking channel based on optimizing one or more parameters comprising an optimal TX power, an optimal data rate, or an optimal channel.

17. The method of claim 15, wherein the discovery channel is assigned by a central dock controller, wherein the central dock controller controls one or more docking stations.

18. The method of claim 15, wherein initiating a wireless docking session further comprising, initiating pairing with the first station device.

19. The method of claim 18, wherein to initiate pairing with the first station device is performed while a user operating the first station device is walking.

20. The method of claim 15, wherein the beacon frame is part of a periodic discovery beacons, wherein the periodic discovery beacons are sent at a predefined interval.

\* \* \* \* \*